Patented Feb. 12, 1946

2,394,754

UNITED STATES PATENT OFFICE 2,394,754

SUBSTITUTED PHENOLS

Gaetano F. D'Alelio, Pittsfield, Mass., assignor to General Electric Company, a corporation of New York No Drawing. Application November 23, 1938, Serial No. 242,022

1 Claim. (Cl. 260—619)

This invention relates to new substituted phenols, and more particularly to a compound selected from the group consisting of 2,4-di-(alpha-phenylethyl) phenol and 2,6-di-(alpha-phenylethyl) phenol.

Styrene, also known as phenyl ethylene and vinyl benzene, and having the formula $$C_6H_5CH:CH_2$$

is a typical example of a highly polymerizable alpha unsaturated aromatic compound. It is present in a xylene fraction that is obtained as a by-product in the manufacture of carbureted water gas. The boiling range of such a fraction will vary, depending upon the closeness of the fractionation. A typical fraction is one having a boiling range of approximately 130° to 146° C. Such a fraction may contain, for example, from 30% to 60% or more of styrene, depending upon the particular concentration processes to which the fraction may have been subjected.

If solutions of styrene in xylene are to be used as spirit thinners for paints and varnishes, and if these thinners are allowed to stand for a prolonged period prior to use, polymerization of the styrene to a substantial degree often occurs. Such polymerization results in the production of a highly viscous solution, which is usually discolored. It also results in a material loss in the solvent power of the xylene. An effective and economical method of separating styrene from xylene to avoid these difficulties has been a considerable problem to manufacturers of carbureted water gas and their by-products. Ordinary distillation technique has not been commercially feasible because of the close boiling points of the components. Styrene has a boiling point of 146° C. while the ortho-, meta- and para-xylenes boil within the range of 138° to 142° C. Further, attempts to separate the styrene by distillation alone are complicated by the readiness with which the styrene polymerizes to form highly viscous or even solid masses. Special extraction procedures for the separation of styrene from xylene can be employed, but the known processes are so costly as to make their use uneconomical.

I have discovered an effective and economical method of removing polymerizable alpha unsaturated aromatic hydrocarbons from mixtures or solutions containing such polymerizable hydrocarbons and volatile diluent or solvent non-ethylenic aromatic hydrocarbons such as xylene. Briefly stated, in carrying out my method the polymerizable component is condensed with a suitable reactive phenolic body in the presence of the volatile diluent aromatic hydrocarbon with which said component is admixed. The reaction is effected in the presence of condensing agents or catalysts, particularly acidic condensing agents such, for example, as fluoboric acid, hydrogen fluoride, aluminum chloride, phosphoric acid and sulfuric acid. Auxiliary condensing agents, for instance acetic anhydride, propionic anhydride or anhydrous zinc chloride, advantageously may be used, in certain cases, with the main condensing agent. Preferably the solution containing the condensation product of the reactive phenolic body with the polymerizable alpha unsaturated aromatic hydrocarbon is treated to neutralize the condensing agent. The solution of the condensation product, with or without neutralization, may constitute a starting material for the manufacture of resinous compositions. Generally, however, the diluent aromatic hydrocarbon is removed by distillation from the reaction mass, after which distillation is continued under vacuum to isolate the particular reaction product or products.

Various reactive phenolic bodies may be used. However, if the diluent aromatic hydrocarbon is to be separately recovered, as by distillation, then the particular phenolic body that is employed should be so chosen that the boiling point of the product of condensing the phenolic component with the polymerizable alpha unsaturated aromatic hydrocarbon will be materially different from the boiling point or boiling range of the particular diluent aromatic hydrocarbon employed.

Among the products obtained by practicing the above-described method are alpha phenyl alkyl phenols having the structural formula

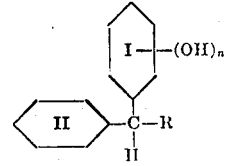

where $n$ equals 1, 2 or 3 and R is an alkyl radical. I is a nucleus derived from either a monohydroxybenzene such as phenol, a dihydroxybenzene such as resorcinol, or a trihydroxybenzene such as pyrogallol, or alkyl, aryl or a nucleus derived from aralkyl substitution products of mono-, di-, or trihydroxybenzenes, the compounds from which the said nuclei are derived having unoccupied reactive positions in the ring, and II is either an unsubstituted benzene nucleus or a substituted benzene nucleus. From the foregoing it will be seen that in the production of alpha phenyl alkyl phenols the phenol reactant may be a monohydric phenol, a polyhydric phenol, or an alkyl, aryl or aralkyl monohydric or polyhydric phenol having at least one unoccupied (unsubstituted) reactive position in the ring. Terms such as "a phenol," "phenolic body" and "phenolic component," as used generally herein, are intended to include within their meaning phenols of the kinds just mentioned.

While in the above structural formula the substitution in the phenolic body is shown in the para position, it is to be understood that this is shown merely by way of illustration, and that the position of the substituent grouping is determined by the general rules of aromatic substitution. Thus if the para position of the reactive phenolic body is occupied, the substituent grouping will appear in the ortho position. Alpha phenyl alkyl phenols can be obtained, for example, by condensing styrene or its homologues with the chosen reactive phenolic body as above described. Mixtures of reactive phenolic bodies, for instance mixtures of cresols, of xylenols, of cresols and xylenols, or of either cresols or xylenols or both with phenol, can be used if desired, thereby producing co-condensed alpha phenyl alkyl phenols.

When phenol is condensed with styrene in a solution of diluent aromatic hydrocarbon such as xylene, I have obtained good yields of unsymmetrical para phenol-phenyl ethane, which also may be named para-(alpha-phenylethyl) phenol and has the structural formula

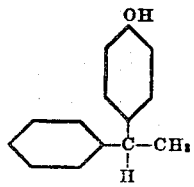

and belongs to a class of hydrocarbons (alpha phenyl alkyl phenols) having the formula

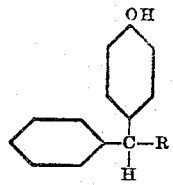

where R is an alkyl radical. Other reactive phenolic bodies when condensed with styrene yield similar condensation products. For example, the product of condensing m-cresol with styrene is para (m-cresol)-phenyl ethane, the structural formula of which is

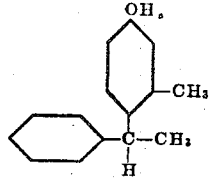

When the reactive phenolic body is phenol and the recovery of the diluent or solvent hydrocarbon is the main aim of the process, then only 1 mol phenol for each 2 or for each 3 mols styrene need be used, since with phenol three positions in the ring are open for forming a condensation product with styrene. The structural formulas of the condensation products, di-(1-phenethyl) phenols or, otherwise named, di-(alpha-phenylethyl) phenols, obtained by condensing 1 mol phenol with 2 mols styrene are

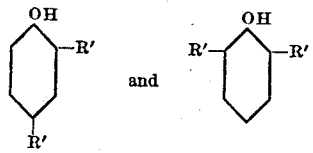

The condensation product, tri-(1-phenethyl) phenol or, otherwise named, tri-(alpha-phenylethyl) phenol, obtained by condensation of 1 mol phenol with 3 mols styrene has the structural formula

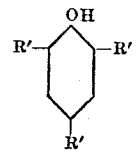

In the above formulas R' represents the 1-phenethyl (alpha-phenylethyl) radical

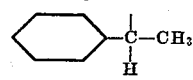

These (alpha-phenylethyl) phenols namely, 2,4-di-(alpha-phenylethyl) phenol, 2,6-di-(alpha-phenylethyl) phenol and 2,4,6-tri-(alpha-phenylethyl) phenol, are particularly suitable for use as antiseptics and as inhibitors of gum formation in gasoline. Such phenols are compounds of the class of compounds corresponding to the general formula

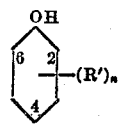

where $n$ is an integer and is at least 2 and not more than 3, R' stands for a substituent grouping represented by the formula

where R represents an alkyl radical, the substituent grouping represented by R' being in positions of the benzene nucleus selected from the following: 2,4; 2,6; and 2,4,6.

In carrying out the condensation reaction between the phenolic component and the polymerizable alpha unsaturated aromatic compound, it is preferred to keep the reaction temperature at or below room temperature when maximum yield of the mono-substituted phenol is desired. Higher temperatures favor the formation of substitution products higher than the mono-derivative. The nature of the solvent non-ethylenic aromatic hydrocarbon is immaterial, since it does not participate in the reaction but acts as a diluent to moderate the reaction. The diluent prevents charring which otherwise may take place due to the heat of condensation that is liberated during the reaction. It also broadens the range of temperature within which the reaction must be carried out if an optimum yield of a particular condensation product is to be obtained.

Concentrations of condensing agents can be varied over a wide range, depending, for example, upon the particular agent employed and the rapidity with which it is desired to carry out the reaction between the chosen reactants. Generally the amount of condensing agent used will not exceed substantially 5% by weight of the reactive phenolic body. With relatively strong condensing agents, such as aluminum chloride and sulfuric acid, satisfactory results have been obtained when the amount of condensing agent corresponded to about 0.2% by weight of the phenolic component. Concentrations of these catalysts above about 5% tend to produce an objectionable amount of tarry materials.

At the end of the reaction period, it is advantageous to treat the resulting mass to remove the catalyst used. This can be done, for example, by washing the mass with water containing alkaline material such as sodium carbonate, sodium bicarbonate and the like. Otherwise, charring of the reaction product may occur when distilling the mass to remove the diluent aromatic hydrocarbon and to isolate the substituted phenol produced during the reaction. Such charring also is usually accompanied by the liberation of sulfur dioxide and trioxide from the mass with obvious disadvantages.

*Example 1*

Equal weights of phenol and a mixture containing approximately 95% styrene and 5% diluent hydrocarbon (mainly xylene) were mixed and treated with 0.2% of the total weight of 96% sulfuric acid. Considerable heat was liberated. The mixture was allowed to stand for 25 minutes and was then refluxed for 25 minutes more. The resulting mass was then neutralized with sodium carbonate solution, dried and fractionated. The xylene was recovered at 138° to 142° C., and the mono-substituted phenol, specifically unsymmetrical phenol-phenyl ethane, was isolated in the fraction boiling between 193° and 205° C. at 20 to 25 mm. vacuum.

*Example 2*

86.75 grams of a mixture containing approximately 60% styrene and 40% diluent hydrocarbon (mainly xylene), which mixture is obtainable as a by-product in the manufacture of carbureted water gas, was reacted with 57.6 grams phenol, using 0.1 gram of 96% sulfuric acid as a catalyst for the reaction. The mixed components were allowed to stand at room temperature (25° to 30° C.) for 4 hours, and the resulting mass was then treated as under Example 1 to recover xylene and unsymmetrical phenol-phenyl ethane.

*Example 3*

173.5 grams of a xylene-styrene mixture containing approximately 30% styrene was reacted with 57.6 grams phenol, using 0.2 gram of 96% sulfuric acid as a catalyst for the reaction. A slow liberation of heat resulted. The mixture was allowed to stand at room temperature for 20 hours. The sulfuric acid was then neutralized and the solution treated as under Example 1. The xylene was recovered at 138°-142° C., and the substituted phenol constituted the fraction boiling between 186° and 210° C. at 20 to 21 mm. vacuum.

*Example 4*

The same proportions of components as specified under Example 3 were used. The mixed components were allowed to stand at room temperature for 20 hours and were then digested under reflux for 15 minutes. The solution was fractionated without further treatment. The xylene was readily recovered. During the isolation of the substituted phenol, some charring of the residue took place and sulfur dioxide and sulfur trioxide were evolved.

*Example 5*

173.5 grams of a 30% solution of styrene in hydrocarbons boiling within the range of 130° to 145° C. was reacted with 96 grams phenol, using 0.1 gram of 96% sulfuric acid as a catalyst for the reaction. The mixture was allowed to stand for 4 hours at room temperature. The sulfuric acid was then neutralized and the product fractionated. The diluent hydrocarbons (mainly xylene) were recovered as the fraction boiling at 130°-145° C. Since an excess of phenol was used (2 mols phenol per mol styrene), the phenol was recovered in the fraction boiling between 145° and 190° C. at atmospheric pressure or between 70° and 110° C. at 20 to 50 mm. vacuum. The substituted phenol constituted the fraction boiling between 186° and 210° C. at 20 to 21 mm. vacuum.

*Example 6*

This example illustrates the preparation of di-(1-phenethyl) phenol and the recovery of xylene from a styrene-xylene azeotrope.

|  | Parts by weight |
|---|---|
| Styrene-xylene azeotrope containing approximately 60% styrene | 173.5 |
| Phenol | 47.0 |
| Concentrated sulfuric acid | 0.15 |

The styrene-xylene azeotrope and the phenol were mixed and the sulfuric acid added slowly with vigorous stirring. The mixed components were allowed to react at room temperature, the mixture being cooled whenever the temperature started to rise. After 3 hours, the reaction no longer was exothermic. The mass was allowed to stand for approximately 65 hours, after which it was washed with a 10% sodium carbonate solution until substantially free from acid and then twice with a saturated salt solution. The washed mass was dried over sodium carbonate for about 16 hours. The sodium carbonate was filtered off, and the resulting product was fractionated as follows:

The xylene was removed by heating at atmospheric pressure, the fraction boiling at 135° to 155° C. comprising the xylene. A vacuum of ½ to 2 mm. was then applied and a fraction was obtained boiling up to 220° C. which comprised mainly mono-(1-phenethyl) phenol. Di-(1-phenethyl) phenol was obtained as a fraction boiling at 220° to 240° C. at ½ to 2 mm. pressure, the larger part boiling within the range of 230° to 236° C. The residue in the flask comprised tri-(1-phenethyl) phenol and resinous matter.

*Example 7*

This example illustrates the preparation of tri-(1-phenethyl) phenol and the recovery of xylene from a styrene-xylene azeotrope.

|  | Parts by weight |
|---|---|
| Styrene-xylene azeotrope containing approximately 60% styrene | 260.0 |
| Phenol | 47.0 |
| Concentrated sulfuric acid | 0.10 |

The same procedure was followed as in Example 6 with the exception that the washed and sodium carbonate-dried product was fractionated as follows:

The xylene was separated, by heating at atmospheric pressure, as a fraction boiling at 135° to 155° C. A vacuum of ½ to 2 mm. was then applied and a fraction was obtained boiling up to 242° C. which comprised mainly mono- and di-(1-phenethyl) phenols. Tri-(1-phenethyl) phenol was obtained as a fraction boiling at 242° to 258° C. at ½ to 2 mm. pressure, the larger part boiling within the range of 250° to 255° C. A small amount of resinous matter remained in the distillation flask.

Although the above description relates particularly to the treatment of solutions of styrene in diluent non-ethylenic aromatic hydrocarbons, it will be obvious to those skilled in the art that solutions of other polymerizable alpha unsaturated aromatic hydrocarbons may be treated in a similar manner. Examples of such unsaturated hydrocarbons which may be condensed in solution state with reactive phenolic bodies and the diluent hydrocarbon subsequently separated from the condensation product, are polymerizable alpha unsaturated aromatic hydrocarbons having a substituent grouping —CH:($C_xH_{2x}$), where $x$ is at least one, or, otherwise stated, compounds of the formula ZCH:($C_xH_{2x}$), where Z is either a substituted or an unsubstituted benzene nucleus, and $x$ is 1 or more.

As stated hereinbefore, the quantity and nature of the reactive phenolic body which is condensed with the polymerizable alpha unsaturated aromatic hydrocarbon may be varied. However, since it is preferred to use a solution of styrene in xylene as starting material, and to recover unsymmetrical phenol-phenyl ethane, I prefer to use phenol as the reactive phenolic body. Advantageously, in producing this product, a mol excess of phenol is used, up to 3 mols phenol per mol of styrene. By reacting an excess of phenol with styrene or other polymerizable alpha unsaturated aromatic hydrocarbon, higher yields of the mono-substituted product are obtained.

The treatment of hydrocarbon mixtures containing diluent non-ethylenic aromatic hydrocarbon and polymerizable alpha unsaturated aromatic hydrocarbons with reactive phenolic bodies, as herein described, facilitates the recovery of the diluent aromatic hydrocarbon in a purified state, that is, the diluent hydrocarbon as thus recovered is substantially free from polymerizable alpha unsaturated aromatic hydrocarbon. It also results in the formation of a substituted phenolic body which is valuable to the paint and varnish industries, and to resin manufacturers, as a starting material for the production of resinous compositions. For example, phenol-phenyl ethane can be condensed with an aldehyde such as formaldehyde to form an oil-soluble resin. The production of such a resin is described more fully and claimed in my copending application Serial No. 242,021, filed concurrently herewith, now Patent No. 2,249,460, issued July 15, 1941, and assigned to the same assignee as the present invention.

What I claim as new and desire to secure by Letters Patent of the United States is:

A compound selected from the group consisting of 2,4-di-(alpha-phenylethyl) phenol and 2,6-di-(alpha-phenylethyl) phenol.

GAETANO F. D'ALELIO.